United States Patent [19]

Kim et al.

[11] Patent Number: 5,768,247
[45] Date of Patent: Jun. 16, 1998

[54] DISK TRANSFERRING DEVICE FOR A DISK CHANGER INCLUDING STRUCTURE TO SUPPRESS HANGING-DOWN OF A DISK DURING TRANSFER

[75] Inventors: Young-taek Kim, Suwon; Cheol-woong Ahn, Seoul, both of Rep. of Korea

[73] Assignee: Samsung Electronics Co., Ltd., Kyungki-do, Rep. of Korea

[21] Appl. No.: 616,345

[22] Filed: Mar. 15, 1996

[30] Foreign Application Priority Data

Aug. 31, 1995 [KR] Rep. of Korea ............... 95-28493

[51] Int. Cl.$^6$ ............................................. G11B 17/10
[52] U.S. Cl. ............................................. 369/191
[58] Field of Search .................... 369/36, 75.1, 77.1, 369/75.2, 178, 192, 191; 360/92

[56] References Cited

U.S. PATENT DOCUMENTS 5,119,354  6/1992  Umesaki ........................... 369/36
5,265,078  11/1993  Akiyama et al. .................. 369/192
5,555,239  9/1996  Takai et al. ....................... 369/192

*Primary Examiner*—Stuart S. Levy
*Assistant Examiner*—George J. Letscher
*Attorney, Agent, or Firm*—Sughrue, Mion, Zinn, Macpeak & Seas, PLLC

[57] ABSTRACT

A disk transferring device for transferring a disk to be extracted from and inserted into a magazine which can contain a plurality of disks and is built in a disk changer. In particular, the disk transferring device includes structure to suppress the hanging-down of the disk while transferring the disk. The disk transferring device of the disk changer can easily ensure that hanging down of the disk is suppressed since a pair of rollers for rotatingly transferring the disk is installed so that the rollers move relative to each other, to effectively support a rear portion of the disk being transferred.

5 Claims, 3 Drawing Sheets

DISK TRANSFERRING DEVICE FOR A DISK CHANGER INCLUDING STRUCTURE TO SUPPRESS HANGING-DOWN OF A DISK DURING TRANSFER

BACKGROUND OF THE INVENTION

The present invention relates to a disk transferring device for transferring a disk to be extracted from and inserted into a magazine which can contain a plurality of disks and is built in a disk changer and, more particularly, to a disk transferring device whose structure is improved to suppress hanging-down of a disk while transferring the disk.

A disk changer is provided with a magazine for containing a plurality of disks in layers in its body. In the disk changer, a disk is extracted from the magazine for playback or the disk is inserted into and stored in the magazine after playback. There are many kinds of disk changers depending on the mechanism for transferring a disk for the extraction or insertion of the disk. A general example of a disk changer is schematically illustrated in FIG. 1.

As schematically shown in FIG. 1, a disk changer 1 is provided with a reproduction portion 2 for reproducing data recorded on a disk 9 and a magazine 3 having a plurality of disk containing portions 3a for containing a plurality of disks 9. In addition, a pair of rollers 4 and 5 are provided between the reproduction portion 2 and the magazine 3 as means for transferring disk 9 from the magazine 3 to the reproduction portion 2 or from the reproduction portion 2 to the magazine 3. Rollers 4 and 5 are rotatably installed to face each other, upwardly and downwardly, respectively. Either of the rollers 4 and 5, in this case, the roller 4 is coupled to a driving source (not shown) for rotating the roller 4.

In the disk changer 1, when inserting the disk 9 into an empty containing portion 3a in the magazine 3 after a playback operation in the reproduction portion 2, the disk 9 from the reproduction portion 2 is inserted between the rollers 4 and 5, and the roller 4 rotates in a direction A by the driving source. Then, the disk 9 is transferred, in a direction B and inserted into the magazine 3, by the frictional force with the roller 4 and roller 5.

However, the transferring mechanism of the disk 9 by the rollers 4 and 5 exhibits a problem in that a rear portion of the disk 9, defined depending on a transferring direction, hangs down by the weight of disk 9 itself. That is, in a case where the disk 9 is transferred in the B direction from the reproduction portion 2 to the magazine 3, a portion of the disk 9 near reproduction portion 2 hangs down to a position marked by a two-dot-dashed line, as shown in FIG. 2. On the other hand, when the disk 9 is transferred from the magazine 3 to the reproduction portion 2, a portion of disk 9 near the magazine 3 hangs down.

Conventionally, to prevent the hanging-down of a disk, a guide rib is provided in the body of a disk changer, for guiding the disk to be transferred. However, this constitution of the conventional disk transferring device has difficulties in effectively suppressing the hanging-down of the disk, since the design is complicated and component tolerance and assembly tolerance impede a correct guidance of the disk.

SUMMARY OF THE INVENTION

The present invention is intended to solve the above-described problem. An object of the present invention is to provide a disk transferring device whose structure is improved, between a disk reproduction portion and a magazine in a disk changer, to easily ensure that hanging-down of a disk caused by the weight thereof is suppressed.

To achieve the above object, there is provided a disk transferring device for transferring a disk between a magazine for containing a plurality of disks and a disk reproduction portion in a disk changer. The disk transferring device comprises a pair of rollers including an upper roller and a lower roller provided between the magazine and the reproduction portion for transferring the disk therebetween, the disk being transferred by the frictional force of the rollers when the rollers rotate. The disk transferring device further includes means for mounting the upper roller and the lower roller so as to move relative with respect to each other in a direction parallel to a disk transferring direction, so that the lower roller supports a rear portion of the disk being transferred.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE PREFERRED EMBODIMENT

A preferred embodiment of the present invention will be described in detail, referring to the accompanying drawings.

Figure 3:
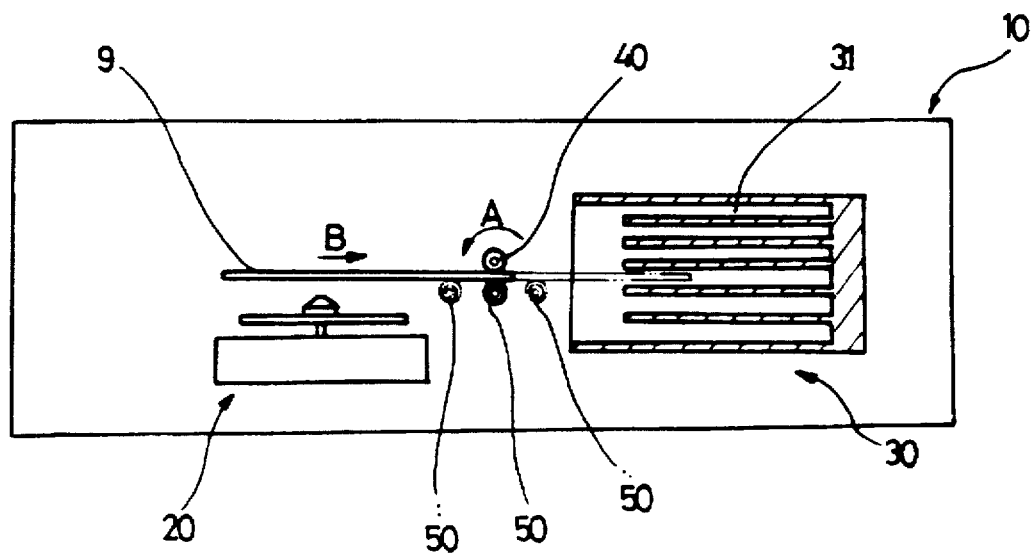
FIG. 3 is a schematic view of a disk changer provided with a disk transferring device according to the present invention.
Figure 4:
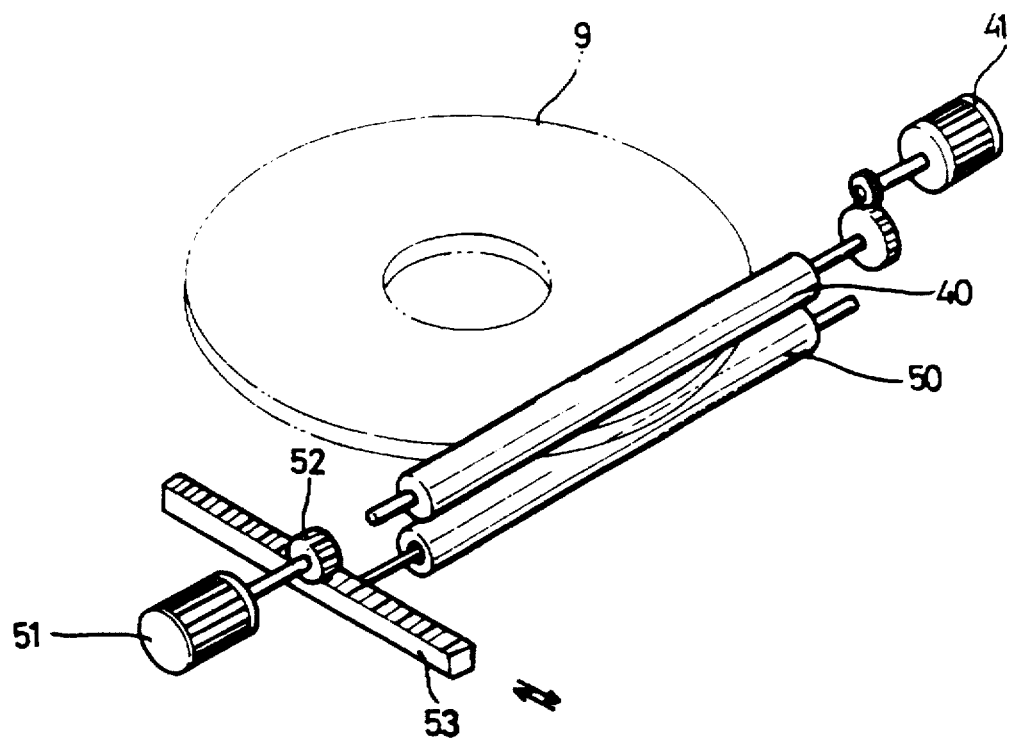
FIG. 4 is a view for explaining the driving of the disk transferring device shown in FIG. 3.

A disk changer 10 shown in FIG. 3 has a disk reproduction portion 20 and a magazine 30 including a plurality of disk containing portions 31 in its body, as in the conventional disk changer 1. A disk transferring device according to the present invention is provided between the reproduction portion 20 and the magazine 30. The disk transferring device according to the present invention has a pair of rollers 40 and 50 which are rotatably installed, facing each other upwardly and downwardly, respectively, as in the conventional disk transferring device. Upper, first roller 40 is coupled to a driving source 41 for rotating the first roller 40, as shown in FIG. 4.

On the other hand, the present invention includes means for mounting the lower, second roller 50 so as to move horizontally relative to the upper, first roller 40 in a direction parallel to a transferring direction of a disk 9. As shown in FIG. 4, the second roller 50 can be moved by a combination of a motor 51 fixed in the body of the disk changer 10, a pinion gear 52 coupled to an output shaft of the motor 51, and a rack gear 53 having gear teeth engaged with the pinion gear 52 and fixed to the second roller 50. Preferably, the shaft of the roller 50 is fixedly secured to the rack 53, while the outer portion of the roller which contacts the disk 9 is rotatable about the fixed shaft. Alternatively, the shaft of the roller 50 may be mounted in a bearing within the rack 53 to permit the shaft to rotate with respect to the rack. Second roller 50 may be transferred by any other means widely used for moving objects, for example, a ball-screw. Further, the second roller 50 may be connected to driving source 41 for rotating first roller 40 by an appropriate power transferring device (not shown).

When the disk 9 is transferred by the disk transferring device of the present invention as constituted above, a rear portion of disk 9, defined depending on a disk transferring direction, is prevented from hanging down. The operation of the disk transferring device will now be described, referring to FIGS. 5 and 6.

Figure 1:
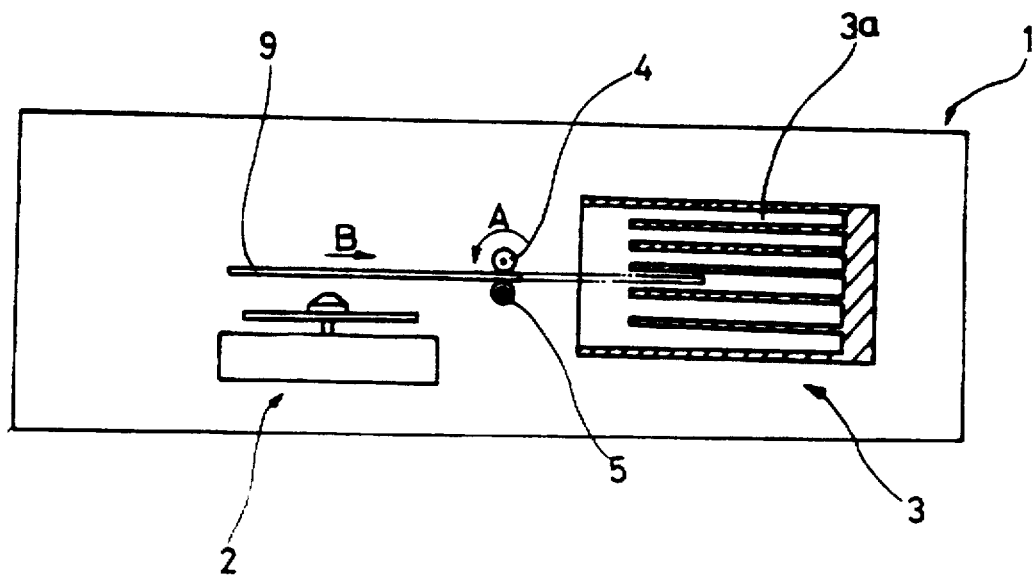
FIG. 1 is a schematic view of a conventional disk changer.
Figure 2:
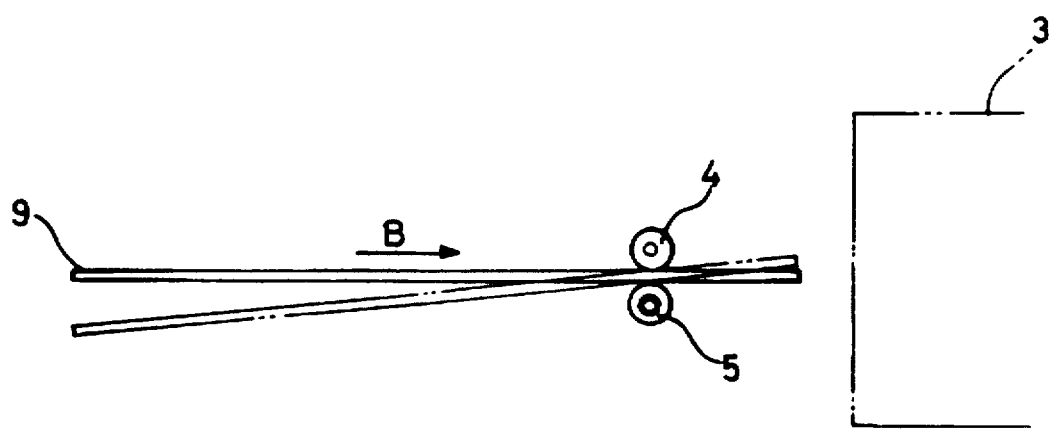
FIG. 2 is a view of a disk transferred by the rollers shown in FIG. 1.
Figure 5:
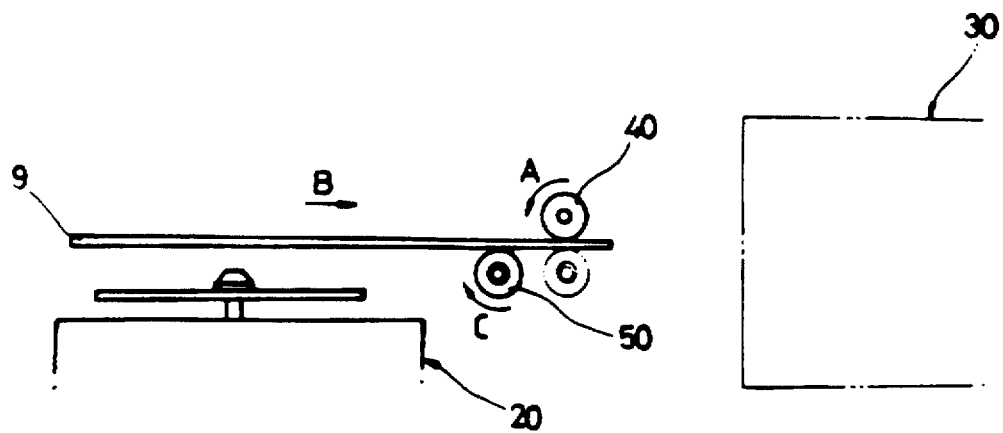
FIGS. 5 and 6 are views of disks transferred by the disk transferring device shown in FIG. 4.

When transferring disk 9 from the reproduction portion 20 to the magazine 30 in the B direction as shown in FIG. 5, the motor 51 rotates in one direction. The rotating force of the motor 51 is transmitted to the second roller 50 through pinion gear 52 and rack gear 53, and the second roller 50 moves horizontally from a position marked by a two-dot dashed line to a position denoted by a solid line. Then, when disk 9 is inserted between the first roller 40 and the second roller 50, the first roller 40 rotates in the A direction by the motor 41 in cooperation with the second roller 50, which rotates in the C direction, to transfer disk 9 in the B direction. At this stage, in the conventional disk transferring device shown in FIGS. 1 and 2, while the second roller 5 supports a disk at a fixed position under the first roller 4, in contrast, the second roller 50 in the present invention supports a rear portion of disk 9 being transferred in the B direction, i.e., a portion near the reproduction portion 20, at a position relatively moved with respect to the first roller 40, thereby suppressing the hanging down of disk 9 caused by its own weight.

Figure 6:
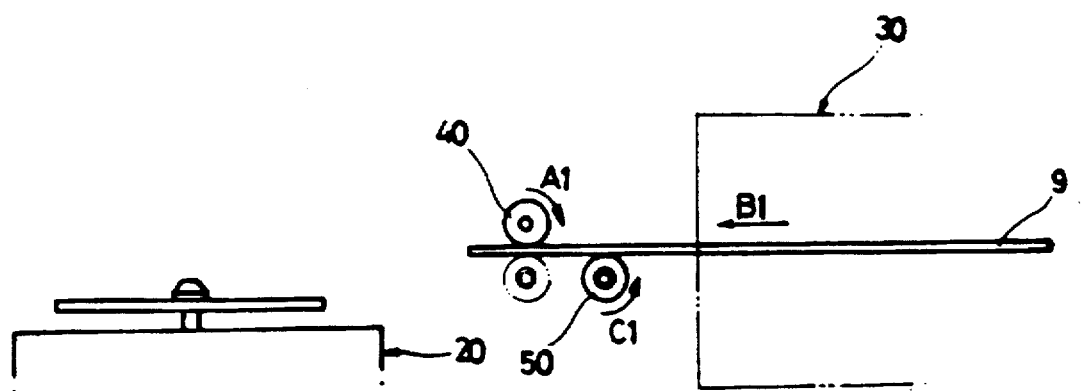

On the other hand, when extracting disk 9 from the magazine 30 and transferring the disk 9 to reproduction portion 20 in the B1 direction as shown in FIG. 6, the motor 51 rotates in the opposite direction and the second roller 50 moves from the position marked by the two-dot dashed line to the position marked by the solid line. Then, when disk 9 is inserted between the first roller 40 and the second roller 50, the first roller 40 rotates in an A1 direction by the motor 41 to transfer disk 9 in the B1 direction in cooperation with the second roller 50 which rotates in a direction C1. At this stage, the second roller 50 supports a rear portion of disk 9 being transferred in the B1 direction, i.e., a portion near the magazine 30, thereby preventing disk 9 from hanging down due to its own weight.

In the above-described embodiment, in order to relatively move the second roller 50 with respect to the first roller 40, the first roller 40 coupled to the driving source 41 for rotating the first roller 40 is kept at a fixed position and the second roller 50 is moved with respect to the first roller 40. Alternatively, the second roller 50 may be kept at a fixed position and the first roller 40 coupled to the driving source 41 may be moved with respect to the second roller 50. In such case, the first roller 40 moves toward a leading end portion of disk 9 being transferred. In addition, the first and second rollers 40 and 50 may move simultaneously in opposite directions by a predetermined distance.

However, to simplify the disk transferring device and facilitate its manufacture, it is desirable to make the second roller 50 move relative with respect to the first roller 40 coupled to the driving source 41 and kept at a fixed position.

Further though the upper, first roller 40 is coupled to the driving source 41 in the above embodiment, the lower, second roller 50 may be coupled to a driving source for rotating the second roller 50.

As described above, the disk transferring device of the disk changer according to the present invention can easily ensure that the hanging down of a disk is suppressed since a pair of rollers for transferring a disk therebetween are installed to move relative with respect to each other, to effectively support a rear portion of the disk being transferred.

It is contemplated that numerous modifications may be made to the disk transferring device of the present invention without departing from the spirit and scope of the invention as defined in the following claims.

What is claimed is:

1. A disk transferring device for transferring a disk in a disk transferring direction between a magazine for containing a plurality of disks and a disk reproduction portion in a disk changer, said disk transferring device comprising a pair of rollers including an upper roller and a lower roller provided between said magazine and said reproduction portion for transferring said disk therebetween, said disk being transferred by a frictional force of said rollers when said rollers rotate, said disk transferring device further comprising:

means for mounting said upper roller and said lower roller so as to move said rollers relative to each other with a translational motion in a direction parallel to the disk transferring direction, so that said lower roller supports a rear portion of said disk being transferred thereby to suppress hanging-down of said disk.

2. The disk transferring device in a disk changer as claimed in claim 1, wherein one of said upper and lower rollers is kept at a fixed position and the other of said upper and lower rollers is moved relative thereto.

3. The disk transferring device in a disk changer as claimed in claim 2, wherein said one of said upper and lower rollers kept at the fixed position is coupled to a driving source for rotating said one of said upper and lower rollers at the fixed position.

4. The disk transferring device in a disk changer as claimed in claim 1, wherein said means for mounting comprises a motor having a rotary output shaft, a pinion gear coupled to said rotary output shaft, and a rack gear having gear teeth engaged with said pinion gear and being fixed to said lower roller, so that said lower roller is moved in the direction parallel to the disk transferring direction.

5. A disk transferring device for transferring a disk in a disk transferring direction between a magazine for containing a plurality of disks and a disk reproduction portion in a disk changer, said disk transferring device comprising a pair of rollers including an upper roller and a lower roller provided between said magazine and said reproduction portion for transferring said disk therebetween, said disk being transferred by a frictional force of said rollers when said rollers rotate, said disk transferring device further comprising:

a motor having a rotary output shaft, a pinion gear coupled to said rotary output shaft, and a rack gear having gear teeth engaged with said pinion gear and being fixed to said lower roller, so that said lower roller is moved relative to said upper roller with a translational motion in a direction parallel to the disk transferring direction to attendantly support a rear portion of said disk being transferred and thereby suppress hanging-down of said disk.

* * * * *